Sept. 11, 1923.
G. A. LYON
1,467,388
AUTOMOBILE BUFFER
Filed Oct. 7, 1922
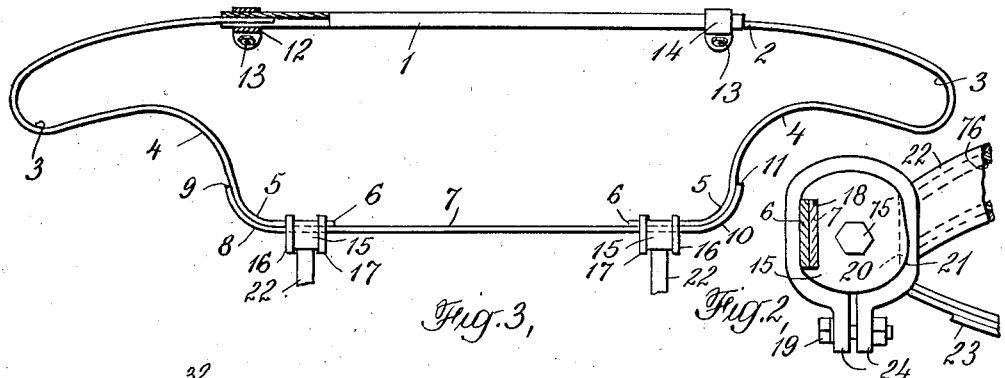
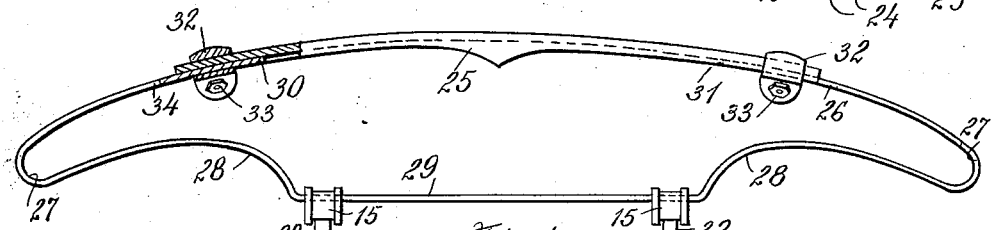
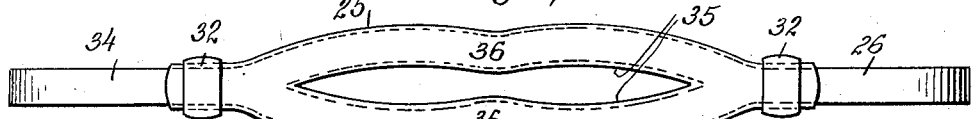
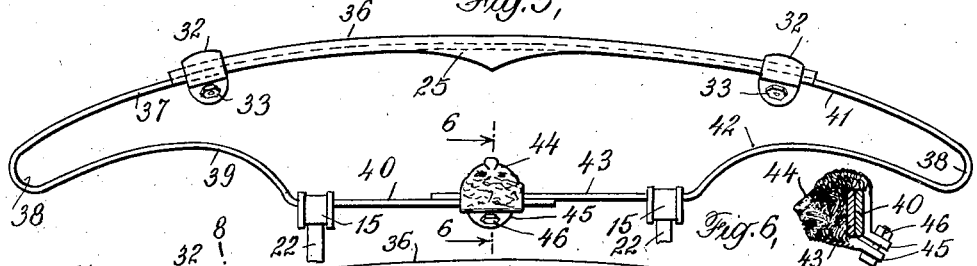
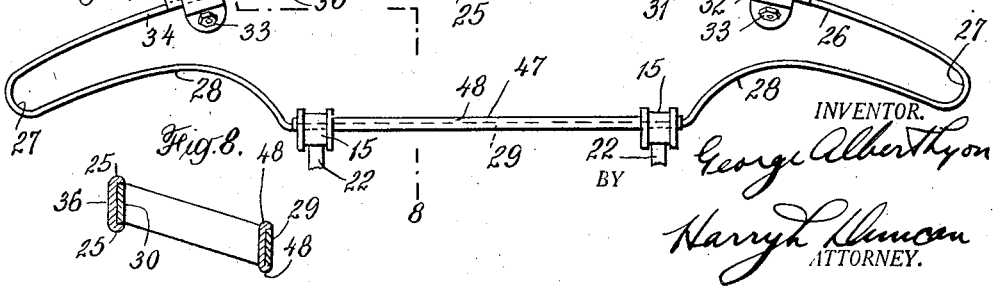
INVENTOR.
George Albert Lyon
BY
Harry L. Duncan
ATTORNEY.

Patented Sept. 11, 1923.

1,467,388

UNITED STATES PATENT OFFICE.

GEORGE ALBERT LYON, OF PHILADELPHIA, PENNSYLVANIA.

AUTOMOBILE BUFFER.

Application filed October 7, 1922. Serial No. 592,940.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffers, of which the following is a specification, taken in connection with the accompanying drawing.

This application is a partial continuation of my application Serial No. 358,239, filed February 12, 1920, and which was renewed on February 4, 1921, as Serial No. 534,275, and Serial No. 547,328, filed March 27, 1922. That is, this case contains subject matter taken therefrom.

This invention relates especially to automobile buffers with which may be combined brace bars, supporting members, or auxiliary buffer portions which may be secured or connected to the automobile or other vehicle frame member to reenforce and strengthen them. For this purpose special frame ends which may be riveted or otherwise connected to the forward ends or portions of the usual channel section frame members of the vehicle may advantageously be provided with laterally extending supporting bosses on one or both sides of each frame member and an enclosing supporting clamp may cooperate with each boss which, if desired, may be recessed to receive and align the brace bar portion. The supporting boss may, if desired, have retainer lugs or portions and aligning faces to engage and align the supporting clamp which may enclose the boss and cooperating brace bar or other supporting portions of the buffer so that the brace bar portions may thus be securely clamped or connected to each of the frame members so as to have a desirable reenforcing action thereon and at the same time support the buffer front of any suitable construction which may be in the same plane or bent upwards in some cases so as to be arranged in a higher plane than the connected rear supporting portions. The brace bar or supporting portions may, if desired, have integrally or otherwise connected end loops and adjacent inturned connector portions to which may be detachably or otherwise connected the buffer front portions preferably formed of spring strip or other resilient elements, so that these impact receiving members may have the desired resilient action under collision conditions. Either the buffer front or the supporting or brace bar portion of the buffer may be formed of spring steel or of resilient channel construction and specially shaped or stamped out steel plates having channel iron or flanged section may be used with advantage in connection with the buffer front to give the desired extra vertical width to this central part of the buffer. If desired, the brace bar or rear supporting portion or member of the buffer may be clamped or connected to separate spring steel or other attaching members connected to the automobile frame instead of being directly connected to socketed or other frame end portions.

In the accompanying drawing showing in a somewhat diagrammatic way various illustrative embodiments of this invention:

Fig. 1 is a plan view partly in section showing one form of construction.

Fig. 2 is an enlarged side sectional view showing one of the frame end supporting devices.

Fig. 3 is a plan view partly in section showing another illustrative buffer.

Fig. 4 is a front view thereof.

Fig. 5 is a plan view showing still another illustrative buffer.

Fig. 6 is a transverse sectional detail taken along the line 6—6 of Fig. 5.

Fig. 7 is a plan view showing still another illustrative buffer, and

Fig. 8 is a transverse section taken along the line 8—8 of Fig. 7.

In the illustrative embodiment of the invention shown in Fig. 1, the brace bar or supporting portion of the buffer may comprise one or more connected strips of spring steel or other suitable and preferably resilient material having end loop portions. As illustrated the brace bar portion or strip 7 may extend beyond the special frame ends or supporting bosses 15 and be provided with stiffening connector portions 8, 9, and 10, 11, which may extend behind and around the one or more spring srtips having cooperating connector portions 5, 6 which may have the integral end loops 3 and curved resilient portions 4 as well as the front connector portions 2, if desired. In this case the buffer front or impact receiving portions may comprise the spring channel 1 cooperating with the front connector portions and if desired having more or less aligning action thereon, these parts being connected by the enclosing clamping devices or clips 12, 14 which may be tightened around the parts by the bolts and nuts 13.

The supporting or brace bar portions of the buffer may as indicated in Fig. 2 be clamped or connected to supporting bosses 15 which may extend on one or both sides of the special frame ends rigidly connected to the usual channeled frame members or goose necks 22. Any convenient means for connecting these parts may be used and as indicated the supporting boss which may project on both sides of the frame member may be formed with an integral supporting or securing portion 76 extending within the channeled frame member and welded, riveted or otherwise connected thereto in a rigid way. This supporting boss may of course accommodate the end of the usual spring 23 which may be secured by a spring hanger bolt 75 passing through the boss if desired. This supporting boss may be formed with a recess 18 of such size as to accommodate the one or more spring strips constituting this supporting brace bar portion of the buffer and a straight or rectangular sectioned recess of this character may support the flat sectioned strips as indicated in Fig. 2 in connection with one or more supporting clamps such as 16, 17 which may be arranged around these parts and strongly clamped upon the same as by a tightening bolt 19 passing through the ends 24 of this clamp. It is usually advantageous to form the one or more bosses provided on each frame member with a retainer lug or portion such as 21 projecting outward to at least a slight extent beyond the cooperating face 20 of the boss which may be substantially flat or vertical, if desired. The supporting clamp of wrought or malleable material may be sufficiently expanded to be slipped over this retainer portion and then tightened inside the same which definitely holds the parts in this securing position and positively prevents the clamps slipping sidewise from the supporting boss. As indicated in Fig. 1 two such supporting clamps 16, 17 may be used on each supporting boss or frame end 15 and in this way an amply strong and rigid connection may be secured between the supporting or brace bar portion of the buffer and the frame ends so as to considerably strengthen and reenforce them against lateral yielding and breakage.

Figs. 3 and 4 show another illustrative buffer in which the rear transverse supporting or brace bar portion may be formed of spring steel strip and having a substantially straight transverse portion 29 which may be attached to special frame ends such as 15, if desired. This rear transverse portion or member may have integral end loops 27 and curved resilient portions 28 and may have the inturned attaching ends or front connector portions 26, 34 which are preferably forwardly curved or arched as indicated so that they end at about the points 30, 31 approximately in line with the frame ends of the automobile, if desired. These front connector portions of the spring strip may be securely connected to the ends of a buffer front plate which may advantageously be formed of a single piece of spring steel about a quarter of an inch thick more or less which may be blanked out and then forged or bent in dies or otherwise so that the parts are given the desired form before the hardening and tempering of the plate which is usually advantageous with this construction. In this way the front plate or connecting contact member of the buffer may be formed as shown in Fig. 4 with several contact faces such as 36 which may have suitable edge strengthening flanges 25 extending more or less along the upper and lower edges of the plate while upper and lower mid-flanges may also be formed along the central opening 35 which may be given the substantially double diamond or double lenticular form indicated, if desired. The longitudinal and rearward extent and location of these stiffening flanges of course depends considerably on the length and thickness of the front plate which may be given a total length sufficient to extend past the attaching members of the buffer while the vertical width of this contact connecting member may be six or eight inches or more, if desired. Under these conditions with the forwardly curved contour of this buffer front plate the upper top flange 25 may extend entirely across the plate and may adjacent its center be given an increased rearward extension as indicated in Fig. 3 so as to form a flange point or angle which also gives the buffer a pleasing and unique appearance harmonizing with its curved front face. It is quite desirable to force or forge down a somewhat thicker or wider connecting portion joining the two mid-flanges at the ends of the central opening 35 so as to strengthen this part of the buffer. The ends of this buffer plate may be advantageously formed with substantially parallel aligning flanges which may project rearward to an extent substantially equal to the thickness of the inturned ends or connector portions of the cooperating strips. By using an enclosing clamping device such as the forged steel clip 32 substantially enclosing these parts and having its angularly extending ends forced together by the tightening bolts 33 so as to force the adjacent part of the clamping device against the rear face of the strip, these parts may be tightly held in adjusted position and a strong and secure connection insured although of course additional or inner bolts or clamping devices or a single clip of greater width may be used at each end of the front plate, if desired.

Fig. 5 shows a generally similar construction in which the front plate may be similarly constructed and connected to the front inturned connector portions 37, 41 of steel strip or other resilient material. In this case two steel strips may be used each having an end loop portion 38 and an integral front connector portion, the strip 37, 38 being curved inwardly and rearwardly at 39 and having a rear supporting portion 40 which may considerably overlap the cooperating connector portion 43 of the other strip 41, 42. With this construction the width of the rear connector portion of the buffer and also the distance apart of its end loops can be adjusted, if desired, and these overlapping reenforcing rear supporting portions or strips may be securely clamped or connected as by the ornamental rear center clamp 44. As is indicated in Fig. 6, this clamp which may have a front in the form of a lion's head may enclose these strips and have its angularly arranged or other clamping ends 45 forcibly brought together by the bolt 46 so as to securely hold these strips in adjusted position.

Fig. 7 shows still another illustrative buffer which may have a generally similar front plate of single or double vertical width, as desired, and similarly connected to the inturned connecting ends or front connector portions 26, 34 of spring strip material. In this instance one or two such spring strips are used each comprising an end loop 27 and an inwardly curving resilient portion 28 which may have inturned rear connector portions or, if desired, may have a single rear connecting or supporting portion 29 extending across the rear of the buffer preferably in connection with a spring-steel or other resilient rear channel member 47, which, as indicated in Fig. 8, may have these inturned rear connecting portions embraced and aligned between its rearwardly extending flanges 48. As indicated in Fig. 8, it is sometimes advantageous to have these two end loop elements of the buffer upwardly inclined so that their front connector portions are two to four inches above the rear supporting portion or member of the buffer. This serves to raise the buffer front somewhat above the frame ends where, for instance, the supporting member is directly connected thereto. All these parts may of course be enclosed and held together by any desired form of clamping or connecting devices such for instance as the enclosing clamps indicated in Fig. 7 in connection with the special recessed frame ends 15.

This invention has been described in connection with a number of embodiments, forms, proportions, parts, arrangements, materials, methods of connection and use, to the details of which disclosure the invention is not of course to be limited since what is claimed as new and what is desired to be secured by Letters Patent is set forth in the appended claims.

1. The automobile buffer comprising a supporting member of spring steel strip having looped ends adapted to extend into portective position adjacent the automobile wheels and having forwardly arched inturned front connector portions and inturned rear connector portions, and comprising a spring channel rear transverse member adapted to receive and align said rear connector portions and be adjustably connected thereto, and comprising a forwardly arched spring steel buffer front plate having a horizontally arranged opening and adjacent vertically separated contact faces near its middle portion and having rearwardly extending edge stiffening flanges, the ends of said front plate comprising flanged connector portions cooperating with said front inturned connector portions and enclosing clamping devices bolted around such cooperating front connector portions.

2. The automobile buffer comprising a supporting member of spring steel strip having looped ends adapted to extend into protective position adjacent the automobile wheels and having inturned front connector portions and inturned rear connector portions, and comprising a rear transverse member adapted to engage said rear connector portions and be adjustably connected thereto, and comprising a spring steel buffer front plate having a horizontally arranged opening and adjacent vertically separated contact faces near its middle portion, the ends of said front plate comprising flanged connector portions cooperating with said front inturned connector portions and enclosing clamping devices bolted around such cooperating front connector portions.

3. The automobile buffer comprising a transverse rear supporting member of steel strip and having looped outer ends adapted to extend into protective position adjacent the automobile wheels and having inturned front connector portions and inturned rear connector portions considerably below said front connector portions, a spring channel sectioned rear transverse member adapted to receive and align said rear connector portions and adjustably connected thereto, and comprising a steel buffer front having vertically wide contact portions near its middle and having stiffening flanges the ends of said front plate comprising flanged connector portions secured to said front inturned connector portions.

4. The automobile buffer comprising a transverse rear supporting member having outer ends adapted to extend into protective position adjacent the automobile wheels and having inturned front connector portions and inturned rear connector portions, a channel sectioned rear transverse member adapted to receive said rear connector portions and adjustably connected thereto, and comprising a steel buffer front having stiffening flanges, the ends of said front plate comprising portions secured to said front inturned connector portions.

5. The automobile buffer comprising a supporting member of steel strip having looped ends adapted to extend into protective position adjacent the automobile wheels and having inturned front connector portions and inturned rear connector portions adapted to be connected together and to the automobile, and comprising a steel plate buffer front having vertically separated contact portions near its middle and having rearwardly extending stiffening flanges, the ends of said front plate comprising connector portions adjustably connected to said front connector portions.

6. The automobile buffer comprising a supporting member of steel strip having looped ends adapted to extend into protective position adjacent the automobile wheels and having inturned front connector portions and inturned rear connector portions connected together and to the automobile, and comprising a steel plate buffer front having vertically wide contact portions near its middle, the ends of said front plate comprising connector portions connected to said front connector portions.

7. The automobile buffer comprising a supporting member of spring steel strip having looped ends adapted to extend into protective position adjacent the automobile wheels and having forwardly arched inturned front connector portions and inturned rear connector portions connected together and to the automobile frame ends, and comprising a resilient buffer front having rearwardly extending stiffening flanges and connector portions cooperating with said front connector portions, and adjustably clamped thereto.

8. The automobile buffer comprising a supporting member of steel strip having looped ends adapted to extend into protective position adjacent the automobile wheels and having inturned front connector portions and inturned rear connector portions connected together and to the automobile, and comprising a resilient buffer front having rearwardly extending stiffening flanges and connector portions cooperating with said front connector portions.

9. The automobile buffer comprising a pair of spring steel strip end loop members having inturned front and rear connector portions, a vertically wide spring steel buffer front plate having channel connector ends clamped to the front connector ends of said end loop members and a rear transverse supporting portion of the buffer comprising a reenforcing element and said rear connector portions of said end loop members.

10. The automobile buffer comprising a pair of spring steel strip end loop members having inturned front and rear connector portions, a spring steel buffer front having flanged connector ends clamped to the front connector ends of said end loop members and a rear transverse supporting portion of the buffer comprising said rear connector portions of said end loop members.

11. The automobile buffer comprising a pair of steel strip end loop members having inturned front and rear connector portions, a spring steel buffer front having flanged connector ends secured to the front connector ends of said end loop members and a rear transverse portion of the buffer comprising said rear connector portions of said end loop members.

12. The automobile buffer comprising end loop members having inturned front and rear connector portions, a buffer front having connector ends secured to the front connector ends of said end loop members and means connecting said rear connector portions of said end loop members.

13. The automobile buffer comprising a pair of upwardly inclined steel strip end loop members having inturned front and rear connector portions, a spring steel buffer front having flanged connector ends secured to the front connector ends of said end loop members to be thereby supported considerably above said rear connector portions and a rear transverse supporting portion of the buffer comprising said rear connector portions of said end loop members and adapted to be secured to an automobile.

14. The automobile buffer comprising upwardly inclined end loop members having inturned front and rear connector portions, a buffer front having connector ends secured to the front connector ends of said end loop members to be thereby supported considerably above said rear connector portions and means connecting said rear connector portions of said end loop members and adapted to be secured to an automobile.

GEORGE ALBERT LYON.